United States Patent [19]

Gillilan

[11] 3,951,834

[45] Apr. 20, 1976

[54] FOAMED PRODUCTS FROM SODIUM SILICATE

[75] Inventor: Warren Gillilan, Holland, Ohio

[73] Assignee: Owens-Corning Fiberglas Corporation, Toledo, Ohio

[22] Filed: Oct. 9, 1973

[21] Appl. No.: 404,478

[52] U.S. Cl. .................................. 252/62; 252/65
[51] Int. Cl.² .................... C04B 43/00; E04B 1/74
[58] Field of Search ............................. 252/65, 62

[56] References Cited
UNITED STATES PATENTS

| | | | |
|---|---|---|---|
| 3,663,249 | 5/1972 | Rao | 252/62 |
| 3,741,898 | 6/1973 | Mallow et al. | 252/62 |
| 3,743,601 | 7/1973 | Rao | 252/62 |

*Primary Examiner*—Leland A. Sebastian
*Assistant Examiner*—Josephine Lloyd
*Attorney, Agent, or Firm*—John W. Overman; Patrick P. Pacella

[57] ABSTRACT

Foamed products from sodium silicate are disclosed. The products are autoclaved after formation of the foam is completed. The foam products are used as structural and insulation material.

4 Claims, No Drawings

FOAMED PRODUCTS FROM SODIUM SILICATE

This invention relates to a process for manufacturing foamed products from sodium silicate and to the products thereof.

The term sodium silicate denotes a compound represented by the formula: $Na_2O \cdot (SiO_2)_n \cdot xH_2O$, wherein $n$ is any number from 1 to 5 and $x$ is the number 1 or larger.

Foamed products formed from sodium silicate are known in the art, e.g., please see U.S. Pat. No. 3,741,898. The foamed products are used as structural and insulation material. The products' resistance to high temperature and moisture, together with low thermal conductivity and excellent mechanical strength, makes the foam especially suited for these uses.

After the foam has been formed, the products are allowed to cure. I now have discovered that curing the foam products in an autoclave after the foam has been formed, results in foam products which are free of structural damage caused by expansion or contraction. If required, after autoclaving, the foamed products can be dried by conventional means without resulting in structural damage caused by expansion or contraction. The autoclaving also shortens the time for cure.

Accordingly, an object of this invention is to provide a process for manufacturing foamed products from sodium silicate wherein the foamed products are autoclaved after the foam has been formed.

Another object is to provide foamed products from sodium silicate wherein the foamed products are autoclaved after the foam has been formed.

Other objects, aspects and advantages of this invention will be apparent to one skilled in the art from the following disclosure and appended claims.

The process of this invention comprises forming a mixture of a surface tension depressant and an aqueous solution of sodium silicate, subjecting the mixture to mixing with a gas at above atmospheric pressure until a wet foam is formed, blending and reacting with the wet foam an insolubilizing agent in an amount sufficient to make a foamed product rigid and resistant to being solubilized by water, pre-hardening the foamed product and autoclaving the resulting foamed product.

Generally, the final product has a density, when dry, ranging up to 20 pounds per cubic foot, an average cell size ranging up to 300 microns in diameter, an average cell wall thickness ranging up to 16 microns and at least 50 cells per cubic millimeter.

In commercially available sodium silicate, the ratio of sodium oxide to silicon dioxide varies from about 1 to 1 to 1 to 5 both by weight and molecularly. Silicon dioxide is insoluable in water but the sodium oxide is soluble. Therefore, it is normally desirable to use sodium silicate that has as high a ratio of silicon dioxide to sodium oxide as practicable as this decreases the amount of soluble material in the final product. Since the sodium silicate used as a raw material is an aqueous solution of sodium silicate the higher the ratio of silicon dioxide to sodium oxide the less soluble the sodium silicate is in water. A large amount of water is undesirable. The preferred sodium silicate has a ratio of silicon dioxide to sodium oxide about 3.25 to 1 at 39 to 42% solids.

The purpose of using surface tension depressants in this invention naturally is to reduce the surface tension of the aqueous solution to allow for the formation of the foam. Among the surface tension depressants which may be used are soaps, detergents, surface active agents, and precursors thereof. Palmitic, oleic, stearic, linoleic, naphthenic and lauric soaps and mixtures thereof and various soaps sold under commercial names may be used. Precursors of soap include saponifiable materials such as organic acids and esters or organic acids including naphthenic acids, rosin acids, tall oil acid, corn oil, soybean oil, and tallow acid. Examples of detergents are the alkaline earth salts of alkyl sulfonic and of alkaryl sulfonate and various commercial detergents. Surface active agents include fatty acid esters of isethionate, substituted taurate salt, sodium salts of sulfated alkaryloxyethers of polyols, fatty acids, alcohol amine condensates, amides, polyoxyethylated fatty alcohols, and alkyl-aryl polyoxy ether-ols.

While the amount of surface depressant can vary widely, generally only as much depressant as is necessary to permit a foam to be formed is added. Normally between 0.5 and 3 parts by weight of surface tension depressant to 100 parts by weight of aqueous sodium silicate solution.

Alkali metal silicate gelling agents can be employed, if desired. If a gelling agent is used, it can be added at any time prior to the addition of the insolubilizing agent. The purpose of using a gelling agent is to make the foam self-supporting until a silicon dioxide polymer is formed in the foam.

Normally, the alkali metal silicate gelling agents are acids or precursors of acids or are materials which reduce the amount of water of solvation associated with the silicate such as alcohols, ketones, glycols, aldehydes and precursors of them. Other specific examples are triacetin, vinyl acetate, methyl acrylate, triphenyl phosphine, metal soaps, aluminum alkoxides, and borax. Some gelling agents also serve as surface tension depressants such as fatty acids and hydrolyzable esters of fatty acids.

If a gelling agent is employed, only as much gelling agent as is necessary to give rigidity is employed.

The insolubilizing agents are chemicals which cause a metathesis or acidification of the sodium silicate and a subsequent or simultaneous cross-linking or chain extension or both of silicon dioxide groups.

The silicon dioxide polymer forming agents are sodium fluorosilicate potassium fluorosilicate; potassium fluoroborate; polyvalent metal salts of weak acids including calcium fluorosilicate, calcium fluoroborate and calcium fluorotitanate; binary inorganic salts; and mixtures thereof.

The term "weak acids" as used herein mean those acids which have a $ph_4$ (logarithm of the disassociation constant) equal to or greater than 1.3. Examples of such acids are phosphoric acid, iodic acid, hydrofluoric acid, hydrogen telluite, aluminic acid, boric acid, acetic acid, fumaric acid, maleic acid, malonic acid and succinic acid. Examples of the polyvalent metal salts of such weak acids include magnesium phosphate (tribasic); calcium fluoride; calcium orthophosphate; calcium pyrophosphate pentahydrate; copper acetate monohydrate; calcium tungstate (scheelite); cadmium tungstate; borate salts of polyvalent metals such as zinc borate, aluminum borate, calcium borate, cobalt borate and iron borate; calcium furmarate, calcium maleate, calcium malonate and calcium seccinate.

The preferred insolubilizing agents are sodium fluorosilicate, potassium fluorosilicate, the calcium and zinc borates, the lithium calcium borates, and the sodium calcium borates with sodium fluorosilicate being the most preferred.

Preferably, the insolubilizing agent is blended with the other ingredients after mixing at above atmospheric pressure. The insolubilizing agent also can be blended with the other ingredients either prior to or during the mixing at above atmospheric pressure, depending upon the speed at which the particular silicon dioxide polymer forming agent reacts.

After the foam has been formed, the foam is pre-hardened at about the same temperature at which the foam is formed. This pre-hardening step generally takes 1 to 2 hours in either dry heat or steam heat.

After pre-hardening, the product is autoclaved under steam pressure. Generally, the autoclaving is carried out at a pressure ranging from 0 to 350 psi for a time ranging from 15 minutes to 12 hours. Preferably, the pressure ranges from 50 to 250 psi and the time ranges from 15 minutes to 4 hours. The ranges on pressure and time herein serve as a guide. The autoclaving conditions serve to relieve the foamed products of stresses which cause structural damage by expansion or contraction.

Introduction of steam into the autoclave is carried out as rapidly as possible. However, introduction times can be as long as 15 or 30 minutes.

After the autoclaving is completed, the pressure is reduced to atmospheric pressure over a period of time ranging from 15 minutes to 2 hours, preferably 30 to 60 minutes.

The foam products then can be air dryed or oven dried by conventional methods if required, without resulting in structural damage caused by expansion or contraction.

If desired, the foam products can contain various amounts of a filler. Examples of fillers are silica, asbestos fibers, glass fibers, and organic fibers.

If desired, the foamed products can be leached using hot water on the acid pH side. The water is heated to a temperature of at least 120°F. with a pH of about 6 being preferred. When sodium fluorosilicate is employed as an insolubilizing agent, leaching is recommended. Leaching generally is carried out after autoclaving and prior to drying.

Specific composites and processes embodying the principles of this invention are set forth in the following examples:

EXAMPLE I

An aqueous sodium silicate solution of about 40% solids and having a ratio of silicon dioxide to sodium oxide of about 3.25 to 1, by weight, was placed in a pressurized, stirred container. Distilled tall oil acid was placed in the container. Air then was fed into the container at a pressure slightly in excess of 20 psi. Thereafter, the contents of the container were thoroughly mixed at this pressure. The resulting wet foam was blended thoroughly with sodium fluorosilicate in a 75% solids slurry in water.

The resulting material was placed in molds having the following sizes in inches: 6 × 6 × 2; 18 × 12 × 2; and 36 × 18 × 4. After the foam has been formed, the foam is pre-hardened at about the same temperature at which the foam is formed. This pre-hardening step generally takes 1 to 2 hours in either dry heat or steam heat. Samples of each size were oven cured at a temperature of about 200°F. at atmospheric pressure.

Free sodium and fluoride then were leached from the material by washing with hot water having a pH of about 6. The small samples (6 × 6 × 2) showed no evidence of cracking, while the remaining large samples cracked and fell apart.

EXAMPLE II

The process of Example I was repeated except that the samples were cured under steam at 195°F. and atmospheric pressure. The small samples (6 × 6 × 2) showed no evidence of cracking, while the remaining large samples cracked and fell apart.

EXAMPLE III

The process of Example I was repeated except that the samples were cured in an autoclave under steam. Steam was introduced into the autoclave over a period of 30 minutes, held at a pressure of 250 psi for 3½ hours and reduced to atmospheric pressure over an additional time period of 30 minutes. All samples showed no evidence of cracking. The cured samples were dried in an oven at about 200°F. and still showed no evidence of cracking or falling apart.

EXAMPLE IV

The process of Examples III was repeated except that the autoclave was held at a pressure of 150 psi for a period of 15 minutes. Steam introduction and reduction times remained the same. All samples showed no evidence of cracking after curing or after subsequent drying.

EXAMPLE V

The process of Example III was repeated except the autoclave was held at a pressure of 50 psi for 30 minutes. Steam was introduced into the autoclave during a time period of only 5 minutes. The reduction of pressure after autoclaving was carried out over a period of time of 50 minutes. All samples showed no evidence of cracking after curing or after subsequent drying.

A comparison of Examples III, IV, and V with Examples I and II, reveals the marked improvement of curing foam products from sodium silicate in an autoclave after the foam has been formed. In Examples III, IV, and V there is no evidence of cracking, while in Examples I and II there is evidence of cracking. Note, subsequent drying after autoclaving still resulted in no structural damage to the foam samples.

While the invention has been described in considerable detail, I do not wish to be limited to the particular embodiments shown and described, and it is my intention to cover hereby all novel adaptations, modifications and arrangements thereof which come within the practice of those skilled in the art to which the invention relates.

I claim:

1. In a process for maufacturing foamed products from sodium silicate comprising the steps of:
   a. forming a mixture of a surface tension depressant and an aqueous solution of sodium silicate;
   b. subjecting the mixture to mixing with a gas at above atmospheric pressure until a wet foam is formed;
   c. blending and reacting with the wet foam an insolubilizing agent in an amount sufficient to make a foamed product rigid and resistant to being solubilized by water, and
   d. pre-hardening the foamed product, the improvement comprising autoclaving the foamed product at a steam pressure ranging from 50 to 250 psi for a time ranging from 15 minutes to 4 hours, after completing step (d).

2. A process according to claim 1 wherein, after the autoclaving, the pressure is reduced to atmospheric pressure over a period of time ranging from 15 minutes to 2 hours.

3. A process according to claim 1 wherein the pressure is reduced to atmospheric pressure over a period of time ranging from 30 to 60 minutes.

4. Foamed products from sodium silicate produced by the process of claim 1.

\* \* \* \* \*